(12) United States Patent
Kumbhar et al.

(10) Patent No.: US 9,719,228 B2
(45) Date of Patent: Aug. 1, 2017

(54) WORK VEHICLE BOOM LOCK

(71) Applicant: Deere & Company, Moline, IL (US)

(72) Inventors: Nilesh Kumbhar, Karad (IN); Travis A. Shekleton, Farley, IA (US); Kyle T. Martin, Ashbury, IA (US)

(73) Assignee: DEERE & COMPANY, Moline, IL (US)

( * ) Notice: Subject to any disclaimer, the term of this patent is extended or adjusted under 35 U.S.C. 154(b) by 134 days.

(21) Appl. No.: 14/667,004

(22) Filed: Mar. 24, 2015

(65) Prior Publication Data

US 2016/0281321 A1   Sep. 29, 2016

(51) Int. Cl.
*E02F 3/34* (2006.01)
*E02F 3/38* (2006.01)
*A01B 1/00* (2006.01)
*A01B 59/00* (2006.01)

(52) U.S. Cl.
CPC .............. *E02F 3/388* (2013.01); *A01B 1/00* (2013.01); *A01B 59/002* (2013.01); *E02F 3/3414* (2013.01)

(58) Field of Classification Search
CPC ..... E02F 3/3405; E02F 3/3408; E02F 3/3414; E02F 3/388
USPC .......... 70/192, 202, 208, 216, 217; 212/292, 212/293; 414/685
See application file for complete search history.

(56) References Cited

U.S. PATENT DOCUMENTS

| | | | | |
|---|---|---|---|---|
| 3,730,362 | A | * 5/1973 | Hurlburt | E02F 3/388 414/697 |
| 3,995,761 | A | * 12/1976 | Hurlburt | E02F 3/388 414/697 |
| 4,039,093 | A | * 8/1977 | Schmitz, Jr. | E02F 3/388 212/292 |
| 4,043,253 | A | 8/1977 | Albright et al. | |
| 4,355,944 | A | * 10/1982 | Lorenc | E02F 3/388 298/17 B |
| 4,388,038 | A | * 6/1983 | Freitag | E02F 3/3405 298/17 B |
| 4,389,154 | A | 6/1983 | Minor et al. | |
| 5,009,566 | A | 4/1991 | Asche | |
| 5,169,277 | A | 12/1992 | Orser et al. | |
| 5,634,762 | A | 6/1997 | Kim | |
| 6,173,590 | B1 | 1/2001 | Witchey | |
| 7,153,084 | B2 | 12/2006 | Horst et al. | |
| 7,618,229 | B2 | 11/2009 | Boling et al. | |
| 2004/0148816 | A1 | 8/2004 | Watanabe | |
| 2006/0245895 | A1 | * 11/2006 | Horst | E02F 3/3405 414/680 |

(Continued)

*Primary Examiner* — Michael McCullough
*Assistant Examiner* — Brendan Tighe (57) ABSTRACT

A work vehicle may include a chassis, linkage, and locking pin. The linkage may include an upper link pivotally connected to the chassis, lower link pivotally connected to the chassis, and boom. The boom may include an upper arm pivotally connected to the upper link, lower arm pivotally connected to the lower link, front arm pivotally connected to a work tool assembly, and locking tab affixed to one of the front arm and the lower arm and protruding from one of the front arm and the lower arm in a direction away from the work tool assembly. The locking pin may be connected to the chassis and extend laterally relative to the chassis from a retracted position outside a travel path of the locking tab to an extended position intersecting the travel path of the locking tab.

15 Claims, 8 Drawing Sheets

(56) References Cited

U.S. PATENT DOCUMENTS

| | | | |
|---|---|---|---|
| 2009/0000158 A1* | 1/2009 | Boling | E02F 3/3414 37/404 |
| 2009/0127218 A1 | 5/2009 | Hylen | |
| 2013/0330161 A1 | 12/2013 | Rich | |
| 2014/0105713 A1* | 4/2014 | Dilts | E02F 3/3414 414/685 |
| 2014/0212254 A1 | 7/2014 | Martin et al. | |

* cited by examiner

WORK VEHICLE BOOM LOCK

FIELD OF THE DISCLOSURE

The present disclosure relates to a machine. An embodiment of the present disclosure relates to a lock for a boom of a work vehicle.

BACKGROUND

Work vehicles may have a linkage between the vehicle's chassis and a work tool. This linkage may include a boom which may be raised or lowered, such as by an actuator such a hydraulic cylinder. A boom lock may be utilized to lock the boom in a particular position or prevent the boom from moving in a particular direction or beyond a certain range or point. As one example, a boom lock may be utilized on a raised boom to prevent the boom from lowering.

SUMMARY

According to an aspect of the present disclosure, a work vehicle may include a chassis, a linkage, and a locking pin. The linkage may include an upper link pivotally connected to the chassis, a lower link pivotally connected to the chassis, and a boom. The boom may include an upper arm, a lower arm, a front arm, and a locking tab. The upper arm may be pivotally connected to the upper link. The lower arm may be pivotally connected to the lower link. The front arm may be pivotally connected to a work tool assembly. The locking tab may be affixed to one of the front arm and the lower arm and protruding from one of the front arm and the lower arm in a direction away from the work tool assembly. The locking pin may be connected to the chassis and extend laterally relative to the chassis from a retracted position to an extended position. The locking pin may be positioned outside a travel path of the locking tab when the locking pin is in the retracted position and positioned to intersect the travel path of the locking tab when the locking pin is in the extended position.

According to another aspect of the present disclosure, a lever may be accessible from an operator's station of the work vehicle and configured to actuate the locking pin between the retracted position and the extended position.

According to another aspect of the present disclosure, a hollow cylinder may be disposed on the chassis and extend through a portion of the chassis, with the locking pin disposed within the hollow cylinder.

According to another aspect of the present disclosure, the locking pin may be included in a lock assembly which includes a lever accessible from within an operator's station of the work vehicle. The lock assembly may be configured such that rotation of the lever in a first direction moves the locking pin toward the extended position and rotation of the lever is a second direction opposite the first direction moves the locking pin towards the retracted position.

According to another aspect of the present disclosure, the locking tab may be integrally formed with the boom.

According to another aspect of the present disclosure, the locking tab may protrude downwardly and rearwardly from a pivotal connection between the boom and the lower link when the linkage is in a boom locking position. The locking tab may be in contact with the locking pin when the locking pin is in the extended position and the linkage is in the boom locking position.

According to another aspect of the present disclosure, a method of operating a boom lock of a work vehicle, the work vehicle including a linkage with an upper link pivotally connected to a chassis, a lower link pivotally connected to the chassis, and a boom with an upper arm pivotally connected to the upper link, a lower arm pivotally connected to the lower link, and a front arm pivotally connected to a work tool assembly, which includes raising the linkage above a boom locking position, extending a locking pin laterally relative to the chassis from a retracted position to an extended position, and lowering the linkage until it is in the boom locking position where a locking tab protruding outwardly from the lower arm away from the front arm is in contact with the locking pin.

According to another aspect of the present disclosure, the extending may be performed by an operator within an operator's station of the work vehicle.

According to another aspect of the present disclosure, the extending may be performed by actuating a lever accessible from within an operator's station of the work vehicle.

According to another aspect of the present disclosure, operating a boom lock of a work vehicle may include raising the linkage until the locking tab is not in contact with the locking pin, retracting the locking pin from the extended position to the retracted position, and lowering the linkage below a boom locking position.

According to another aspect of the present disclosure, the locking tab may be integrally formed with the boom.

According to another aspect of the present disclosure, a work vehicle may include a chassis, a linkage including an upper link, a lower link, and a boom, a locking tab, and a locking pin. The upper link may be pivotally connected to an upper rear portion of the chassis at a first end and pivotally connected to a boom at a second end opposite the first end. The lower link may be pivotally connected to an upper front portion of the chassis at a first end and pivotally connected to the boom at a second end opposite the first end. The boom may include a forked shape with a front arm at its forward end which forks into an upper arm and a lower arm at its rearward ends. The front arm may be positioned forward of the upper arm and the lower arm and pivotally connected to a work tool assembly at one end. The upper arm may be positioned above the lower arm and rearward of the front arm when the linkage is at a position where the work tool assembly is resting on the ground. The upper arm may be fixedly connected to the front arm at a first end and pivotally connected to the upper link at a second end opposite the first end. The lower arm may be fixedly connected to the front arm at a first end and pivotally connected to the lower link at a second end opposite the first end. The locking tab may extend a distance from a pivotal connection between the boom and the lower link in a direction away from the front arm and be connected to at least one of the lower arm and the lower link. The locking pin may be connected to the chassis and laterally extendable relative to the chassis from a retracted position to an extended position. The locking pin may be positioned to be outside a travel path of the locking tab when the locking pin is in the retracted position and positioned to intersect the travel path of the locking tab when the locking pin is in the extended position.

According to another aspect of the present disclosure, the locking tab may be fixedly connected to the lower arm.

According to another aspect of the present disclosure, the locking tab may be integrally formed with the lower arm.

According to another aspect of the present disclosure, the locking tab may be fixedly connected to the lower link.

According to another aspect of the present disclosure, the locking tab may be integrally formed with the lower link.

According to another aspect of the present disclosure, the lever may be connected to the locking pin and accessible from within an operator's station of the work vehicle. The lever may be configured such that actuation of the lever moves the locking pin between the retracted position and the extended position.

According to another aspect of the present disclosure, the locking tab may protrude downwardly and rearwardly from a pivotal connection between the boom and the lower link when the linkage is in a boom locking position. The locking tab may be in contact with the locking pin when the locking pin is in the extended position and the linkage is in the boom locking position.

According to another aspect of the present disclosure, a hollow cylinder may be disposed on the chassis and extend through a portion of the chassis, with the locking pin disposed within the hollow cylinder.

According to another aspect of the present disclosure, the locking pin may be included in a lock assembly which also includes a lever accessible from within an operator's station of the work vehicle. The lock assembly may be configured such that rotation of the lever in a first direction moves the locking pin toward the extended position and rotation of the lever is a second direction opposite the first direction moves the locking pin towards the retracted position.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
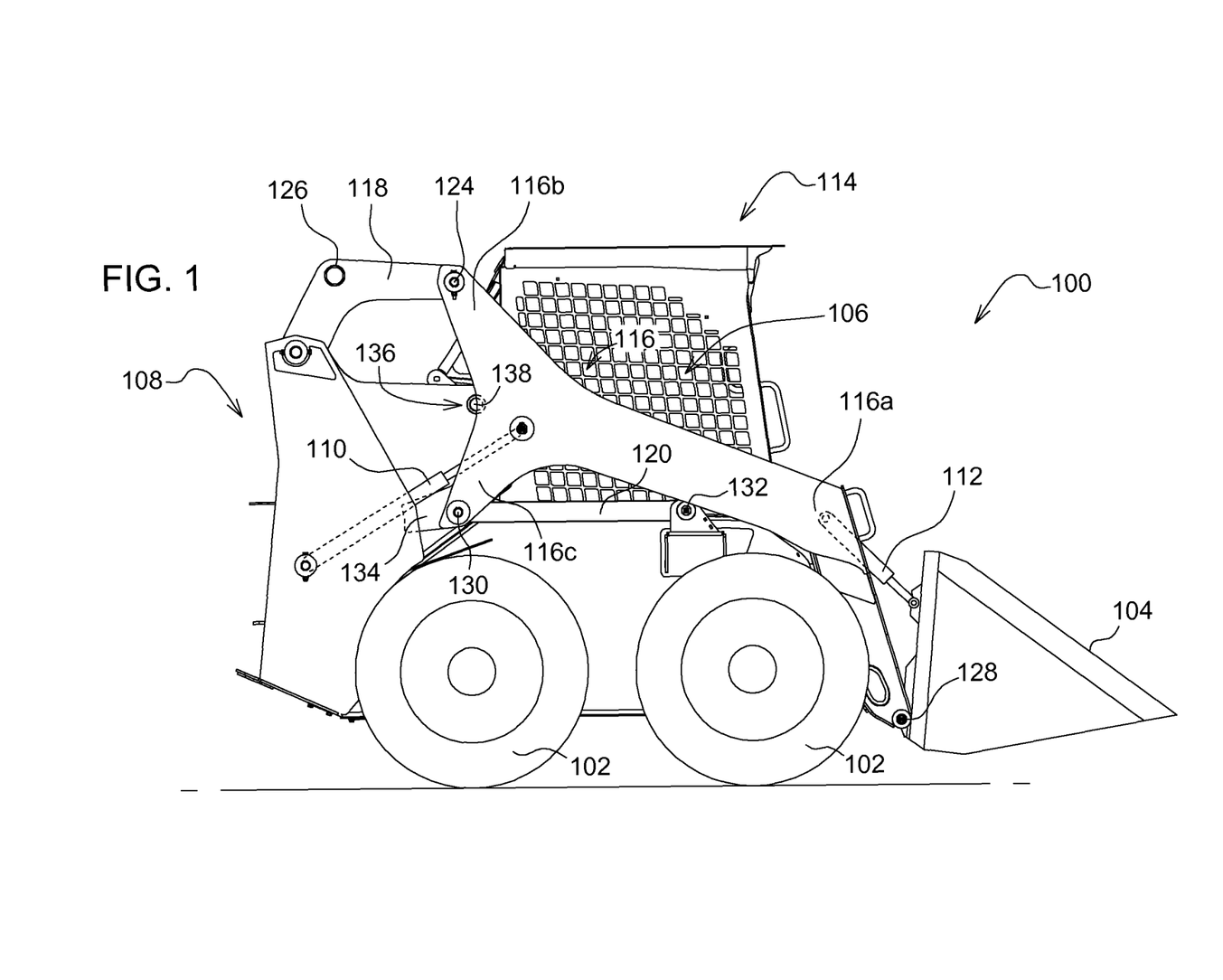
FIG. 1 is a right side view of a work vehicle, for example a skid steer loader, with a linkage in a ground level position.

FIG. 1 is a side view of a work vehicle 100. The work vehicle 100 is illustrated as a skid steer, which may also be referred to as a skid steer loader, but may be any work vehicle which may be configured with a similar style of linkage, including agricultural, construction, or forestry work vehicles. Work vehicle 100 is provided with rolling support by wheels 102, of which there are four. These wheels 102 are rotationally coupled, such as by chains, such that those on the left side of the work vehicle 100 rotate at the same speed and those on the right side of work vehicle 100 rotate at the same speed. In order to turn, the wheels on the left side of the work vehicle 100 may be operated at a different speed, or in a different direction, from the wheels on the right side of the work vehicle 100. In alternative embodiments, other ground-engaging components may be used, such as tracks.

The work vehicle 100 is equipped with a multiple member linkage 106. A work tool 104 is pivotally connected at a forward portion of the linkage 106, while a rear portion of linkage 106 is pivotally connected to a chassis 108 of the work vehicle 100. The work tool 104 is illustrated as a bucket, but may be any number of work tools such as forks, a blade, an auger, a drill, or a hammer, just to name a few possibilities. The linkage 106 may be raised or lowered by a pair of lift cylinders 110, and the work tool 104 may be tilted by a pair of tilt cylinders 112. Each of the lift cylinders 110 and the tilt cylinders 112 are double-acting hydraulic cylinders actuated by the flow of pressurized hydraulic fluid from a hydraulic control valve, which in turn is controlled by an operator in operator station 114. The retraction of the lift cylinders 110 lowers the linkage 106 to a ground level position, as shown in FIG. 1, and the extension of the lift cylinders 100 raises the linkage 106 to a raised position, as is shown in FIG. 1. The extension of the tilt cylinders 112 tilts the work tool 104 forward and downward (e.g., dumps a bucket) while their retraction tilts the work tool 104 backward and upward (e.g., curls or racks a bucket).

The linkage 106 includes a boom 116, an upper link 118, and a lower link 120, of which there are one on each of the left and right sides of the work vehicle 100. The boom 116, upper link 118, and lower link 120 are each weldments comprising multiple pieces of steel (some of which are formed) joined by welds, but in alternative embodiments these may be formed in an alternative manner (e.g., a solid sheet of steel, a casting) or of alternative materials. The configuration of linkage 106 may also be referred to as a modified radial lift linkage, or a vertical lift linkage. The linkage 106 may also include other components, including additional members in some embodiments.

A rearward portion of the upper link 118 pivotally connects to the chassis 108 near an upper and rearward portion of the chassis 108, substantially about the first axis 122 although the exact axis of rotation may vary with manufacturing variations. A forward portion of the upper link 118 pivotally connects to the boom 116 substantially about the second axis 124. In this embodiment, the upper link 118 has a boomerang shape, with a first end of the boomerang curved about the first axis 122, the second end of the boomerang curved about the second axis 124, and a crosstube 126 intersecting the upper link 118 near its center. As used herein, and as can be seen in FIG. 1, "end" is not intended to mean the extreme end of an object. In this embodiment, the upper link 118 on the left and right sides of work vehicle 100 are fixedly connected to each other by the crossbar 126, which may provide a load path between the left and right sides of the linkage 106 that may increase the strength and rigidity of the linkage 106.

The boom 116 forms a forked shape, with a front arm 116a forming its forward portion and splitting into an upper arm 116b and a lower arm 116c for its rearward portion. The front arm 116a of the boom 106 pivotally connects to the work tool 104 substantially about the third axis 128. The upper arm 116b of the boom 116 pivotally connects to the upper link 118 substantially about the second axis 124. The lower arm 116c pivotally connects to the lower link 120 substantially about a fourth axis 130.

The lower link 120 is a straight bar, which has a rearward portion pivotally connected to the boom 116 substantially about the fourth axis 130 and a forward portion pivotally connected to the chassis 106 substantially about a fifth axis 132.

The linkage 106 may be referred to as a modified radial linkage (or the work vehicle 100 may be referred to as a modified radial machine) due to its performance characteristics when being raised and lowered. Certain skid steers may utilize a single rigid member for a linkage, with a first end of the member pivotally connected to near the rear of the chassis of the skid steer and the second end pivotally connected to the work tool. When such a linkage, which may be referred to as a radial linkage or a radial boom, is raised or lowered, the second end of the boom traces an arc as the boom rotates about its first end. By contrast, when the linkage 106 is raised or lowered, the third axis 128 does not trace an arc but instead traces a path which is closer to a vertical line than that of a radial linkage due to the kinematics of the boom 116, the upper link 118, and the lower link 120.

The linkage 106 includes a tab 134, which may also be referred to as a locking tab, which is a plate affixed to the lower arm 116c of the boom 116. The lower arm 116c comprises a box shape, with two substantially vertical sheets of steel spaced apart, and the tab 134 is affixed to the medial vertical sheet. The tab 134 protrudes outwardly from the lower arm 116c in a direction opposite the work tool 104. The tab 134 protrudes outwardly from the lower arm 116c a distance beyond the fourth axis 130 and the pin interconnecting the lower arm 116c and the lower link 120. In alternative embodiments, the tab 134 may be affixed to a different portion of the lower arm 116c or may instead be connected to the lower link 120 instead of the boom 116.

Figure 2:
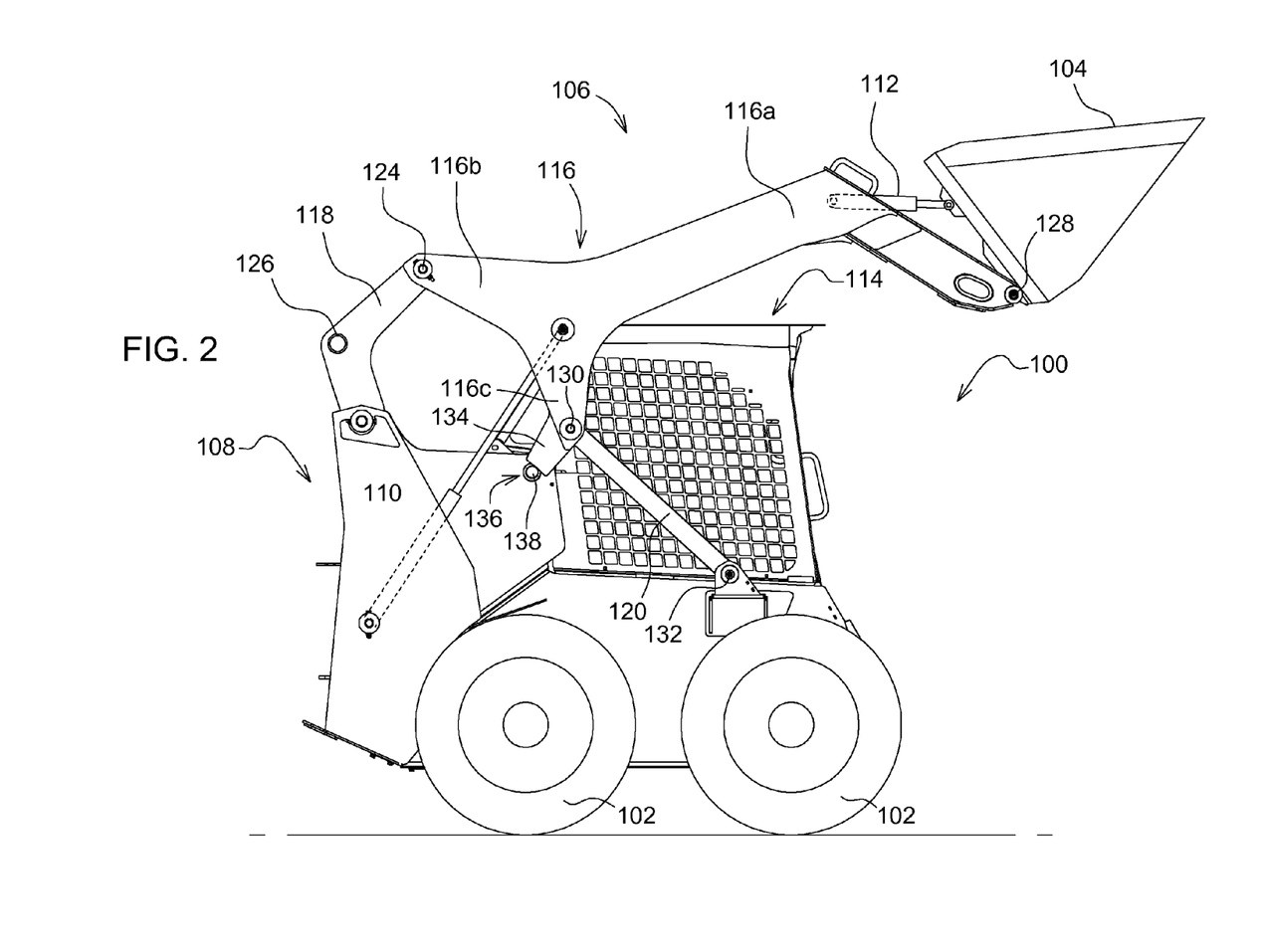
FIG. 2 is a right side view of the work vehicle with the linkage in a boom lock position.

FIG. 2 is a side view of vehicle 100 with the linkage 106 at a raised position. Specifically, linkage 106 is located at a boom lock position where the linkage 106 is mechanically blocked from lowering by a boom lock 136 contacting the tab 134 and preventing further motion of the tab 134 along the travel path of the boom 116. The boom lock 136 is connected to the chassis 108 of the vehicle 100 in such a manner as to be rigid and able to withstand the weight of the linkage 106 through the tab 134. The boom lock 136 may also be known as a boom lock assembly or a lock assembly.

Figure 3:
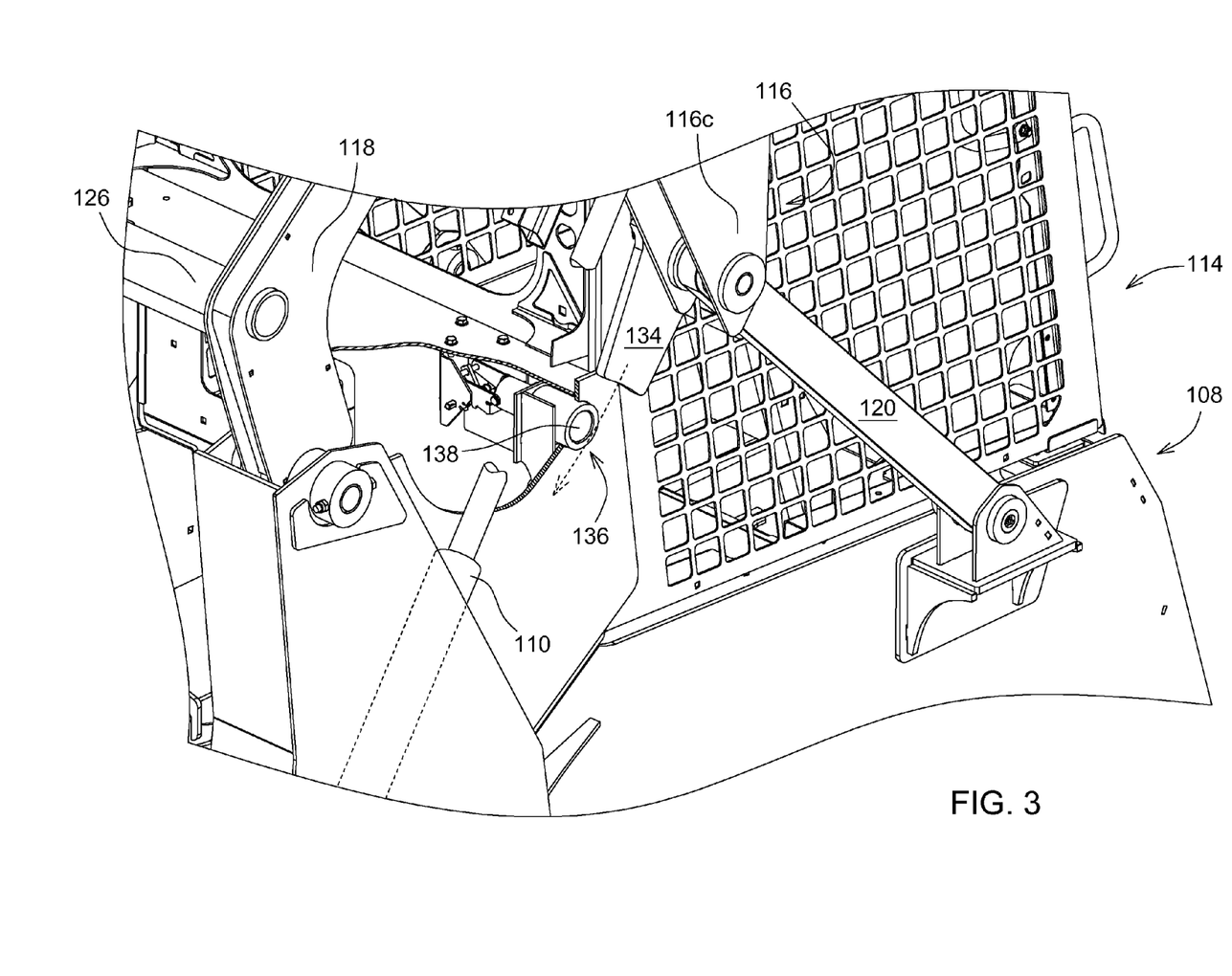
FIG. 3 is a perspective view of a boom lock of the work vehicle, with portions of the work vehicle removed, the boom lock in an unlocked position, and the linkage in a raised position.
Figure 4:
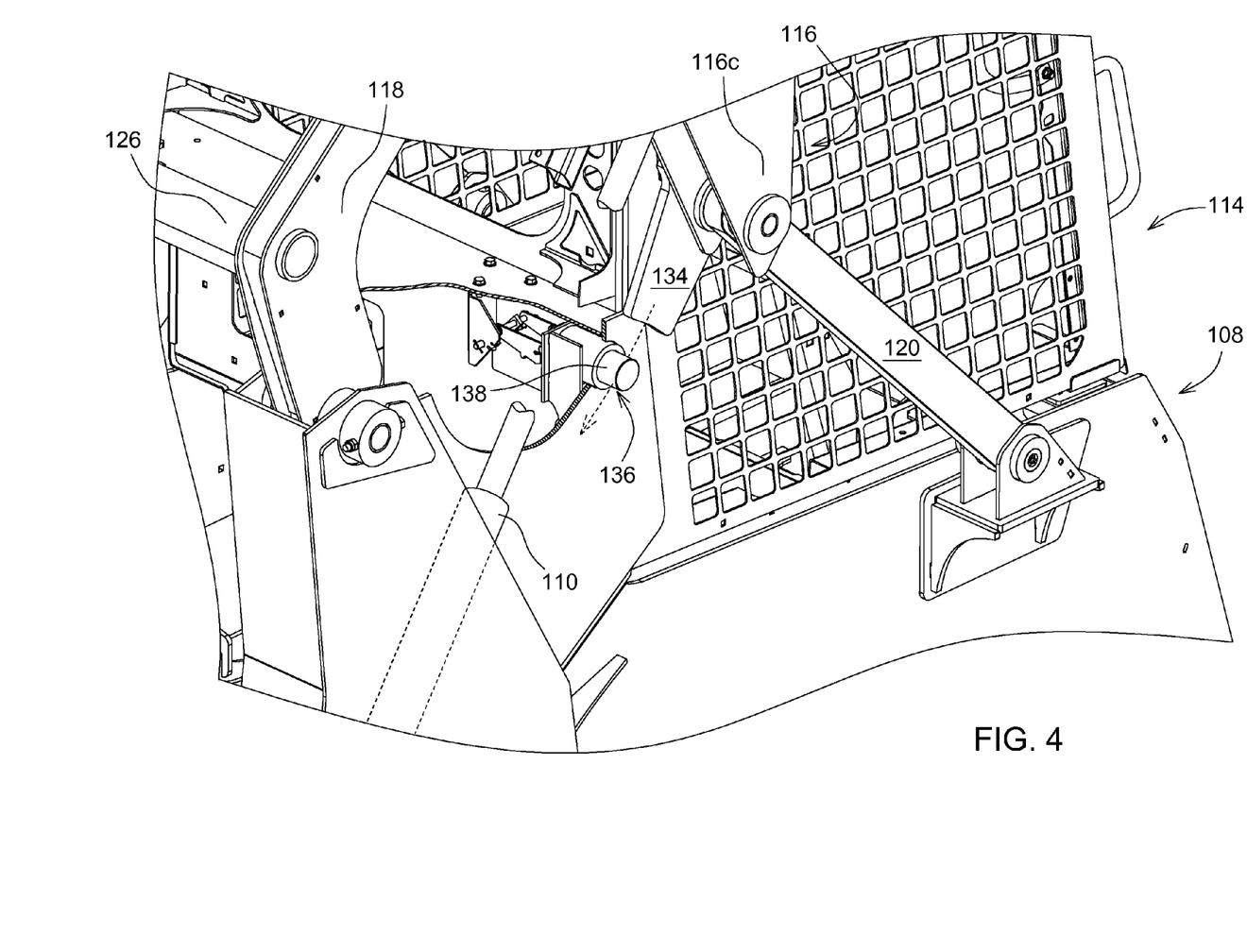
FIG. 4 is a perspective view of the boom lock of the work vehicle, with portions of the work vehicle removed, the boom lock in a locked position, and the linkage in the raised position.
Figure 5:
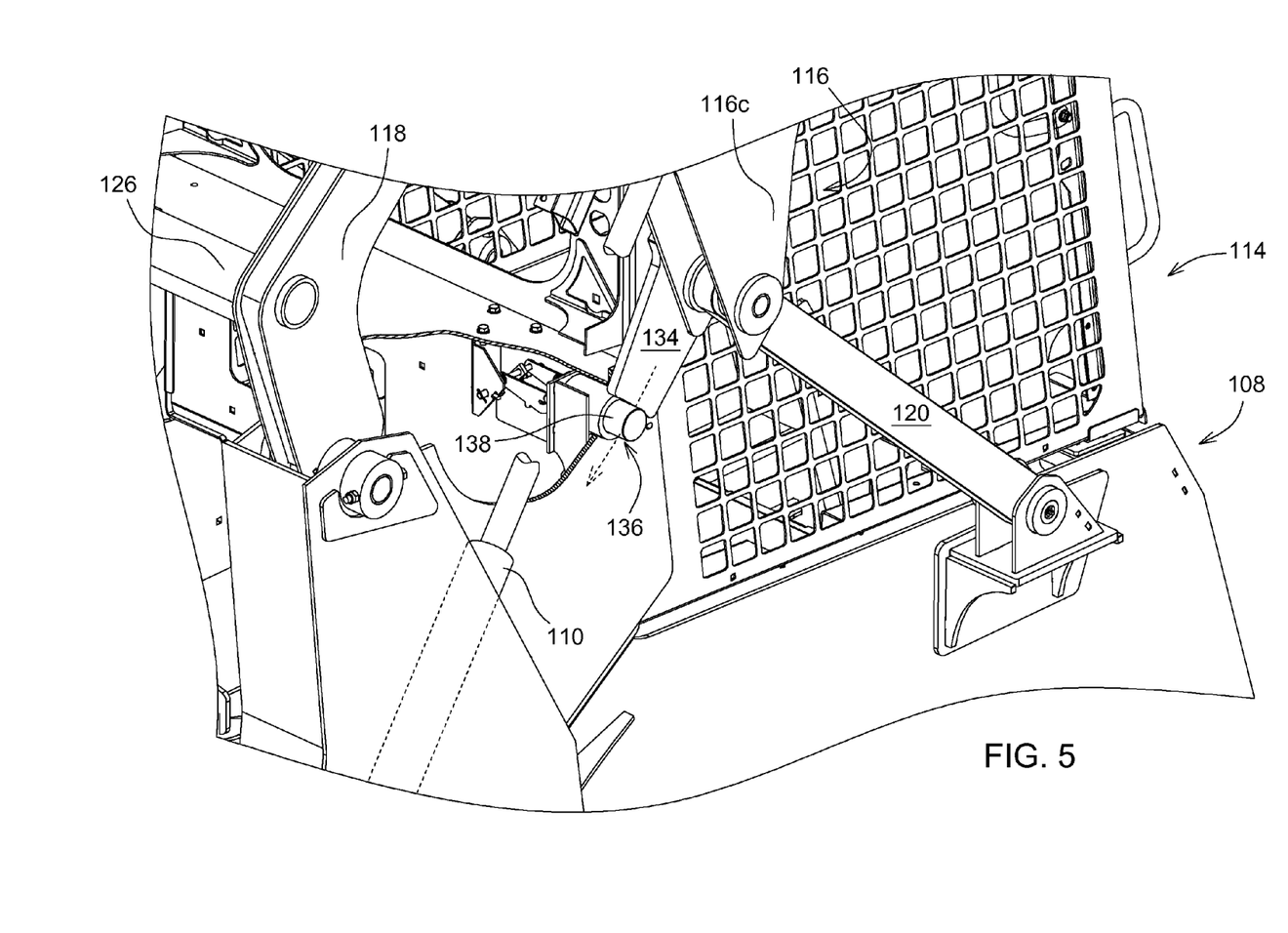
FIG. 5 is a perspective view of the boom lock of the work vehicle, with portions of the work vehicle removed, the boom lock in a locked position, and the linkage in a boom lock position.

As shown in FIGS. 3-5, the tab 134 and the boom lock 136 cooperate to form a boom locking system which may be actuated by an operator within the operator station 114. To utilize this system, the operator may command the linkage 106 to be raised to a position where the tab 134 is above the boom lock 136, or at a position of linkage 106 above the boom lock position, which may also be referred to as a raised position. This raised position of linkage 106 is shown in FIG. 3, with the boom lock 136 in an unlocked position. A locking pin 138 of the boom lock 136 is retracted when the boom lock 136 is in the unlocked position.

The operator may then actuate the boom lock 136, such as by turning or sliding a lever or pin which may be reached by the operator while remaining within the operator station 114, causing the boom lock 136 to move from an unlocked position to a locked position where the boom lock 136 is in the travel path of the tab 134, as is shown in FIG. 4. Specifically, actuating the boom lock 136 from the unlocked position to the locked position entails moving the locking pin 138 from an unlocked position in which it is retracted and outside the travel path of the tab 134 to a locked position in which it is extended and intersects the travel path of the tab 134. By intersecting the travel path of the tab 134 below the location of the tab 134, the locking pin 138 blocks the tab 134 from moving further downward on this travel path.

After actuating the boom lock 136 to the locked position, the operator may command the linkage 106 to lower until the tab 134 is in contact with the boom lock 136 and the linkage 106 is in the boom lock position, as is shown in FIG. 5. To unlock the linkage 106, the operator may command the linkage 106 to be raised to a position where the tab 134 is above the boom lock 136, and then actuate the boom lock 136 from the locked position to the unlocked position, essentially reversing the locking operation. The operator may then lower the linkage 106 past the boom lock position, as the boom lock 136 is no longer in the travel path of the tab 134.

Figure 6:
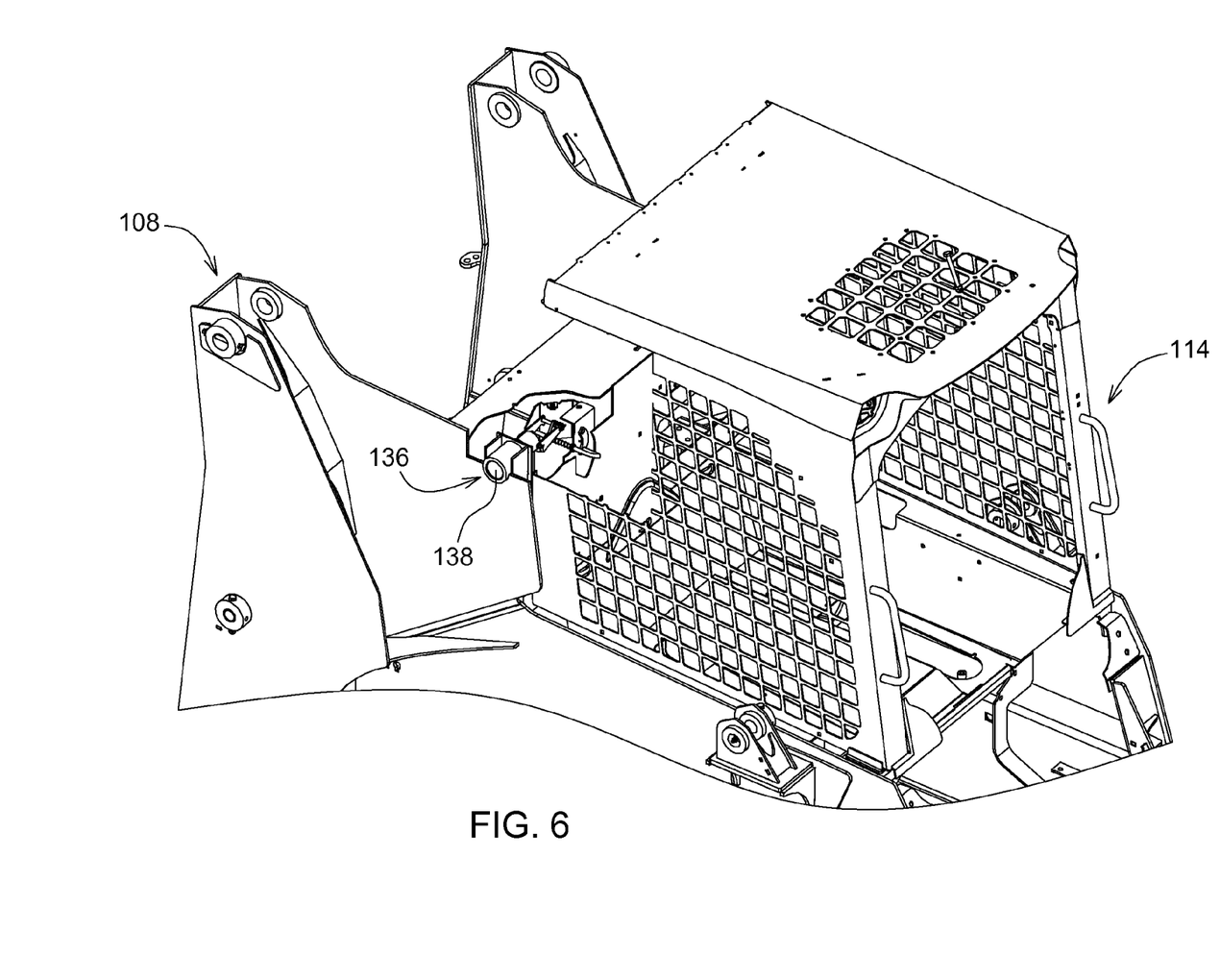
FIG. 6 is a perspective view of the boom lock in the unlocked position.

FIG. 6 is a perspective view of the boom lock 136 with portions of the vehicle 100 removed. As can be seen in FIG. 6, the boom lock 136 is rigidly connected to the chassis 108 but is installed through the chassis 108 near the back of the operator station 114. The boom lock 136 is installed such that the end of the boom lock 136 with the locking pin 138 is located on the outside of the chassis 108 while the opposite end of the boom lock 136 is located within the operator station 114, at a rearward and upper portion of the operator station 114. This configuration allows an operator within operator station 114 to actuate the boom lock 136 between the locked and unlocked positions without leaving the operator station 114, and without the assistance of a second individual.

Figure 7:
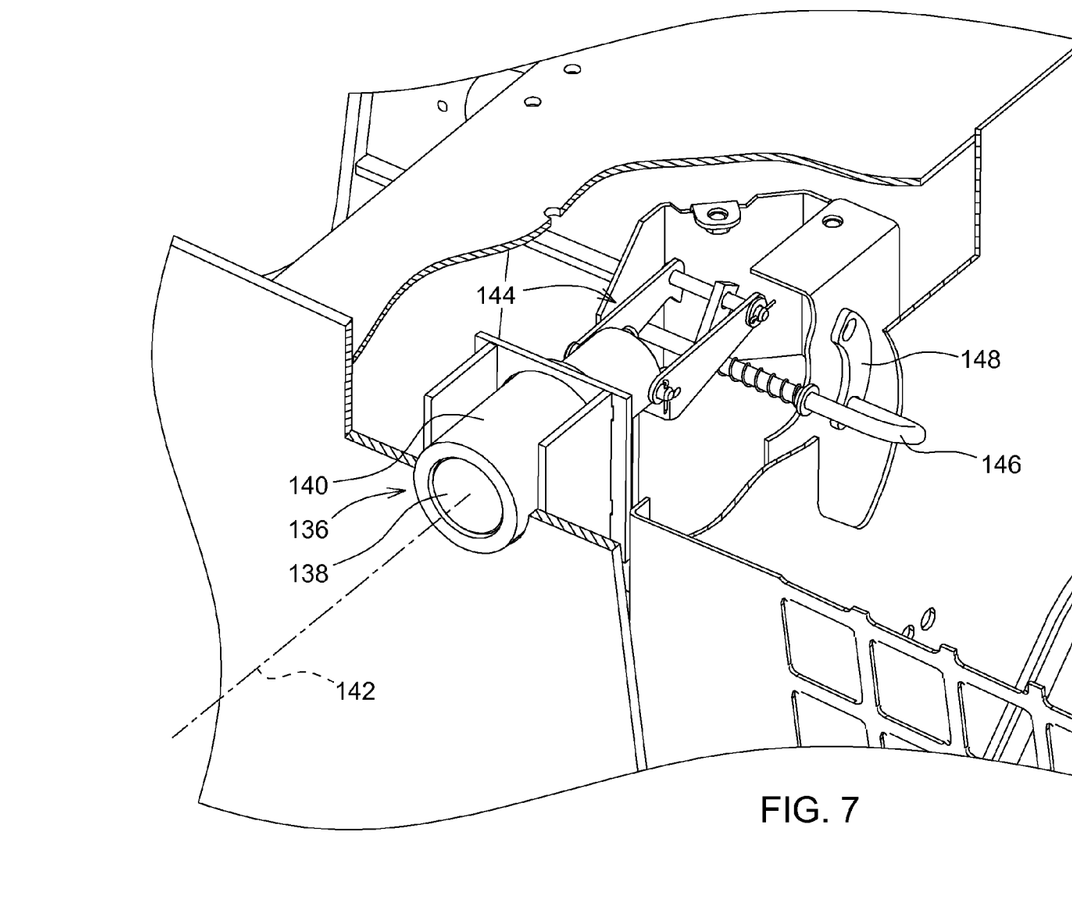
FIG. 7 is a perspective view of the boom lock in the unlocked position.

FIG. 7 is a perspective view of the boom lock 136 in the unlocked position. In this view, locking pin 138 is in the unlocked position and is retracted within boss 140. In the unlocked position, the locking pin 138 does not intersect the travel path of the tab 134 and is instead outside of the travel path. In this embodiment, no portion of the locking pin 138 extends beyond the end of the boss 140 when the locking pin 138 is in the unlocked position. Locking pin 138 is slidingly disposed within boss 140 such that boss 140 resists displacement of the locking pin 138 away from a sixth axis 142, a longitudinal axis of boss 140, while allowing for movement of the locking pin 138 in the direction of sixth axis 142. Boss 140 may be affixed directly to chassis 108, rigidly connected to chassis 108 through intermediate components, or a combination of both.

Figure 8:
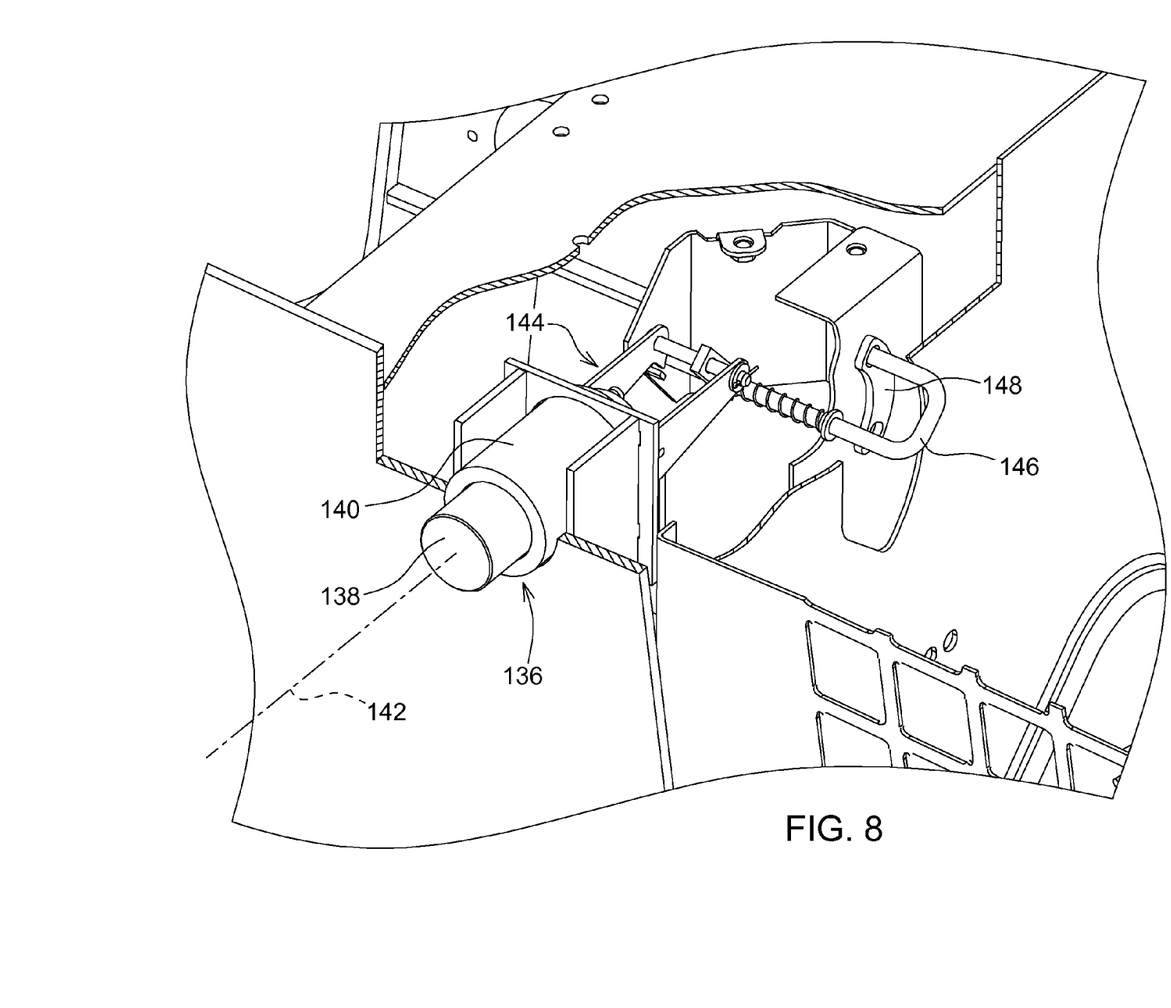
FIG. 8 is a perspective view of the boom lock in the locked position.

FIG. 8 is a perspective view of the boom lock 136 in the locked position. In this view, locking pin 138 is in the locked position and is extended beyond boss 140. In the locked position, a portion of the locking pin 138 extends beyond the end of the boss 140 and into the travel path of the tab 134, thereby blocking the downward travel of the tab 134 and the associated downward movement of the linkage 106.

Locking pin 138 may be moved by an actuation assembly 144, which is pivotally connected to locking pin 138 on the medial side of locking pin 138 as shown in FIGS. 7 and 8. Actuation assembly 144 comprises a series of rigid members pivotally interconnected so as to translate rotational motion on a lever 146 located in operator station 114 into sliding motion of locking pin 138. The lever 146 is formed with a U-shape at the end within the operator station 114 and is spring biased to pull its end into one of two holes in a locking plate 148 mounted on the back of the operator station 114. An operator may pull the lever 146 out from the locking plate 148, against the force of the spring-biasing, and rotate it to move between the unlocked and locked positions for the locking pin 138, and then release the lever 146 to allow the spring-biasing to pull the end of the lever back into one of the two holes in the locking plate 148.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A work vehicle comprising:
a chassis;
a linkage comprising:
an upper link pivotally connected to the chassis;
a lower link pivotally connected to the chassis; and
a boom comprising an upper arm, a lower arm, a front arm, and a locking tab, the upper arm pivotally connected to the upper link, the lower arm pivotally connected to the lower link, the front arm pivotally connected to a work tool assembly, the locking tab affixed to one of the front arm and the lower arm, the locking tab protruding from one of the front arm and the lower arm in a direction away from the work tool assembly; and
a locking pin connected to the chassis, the locking pin laterally extendable relative to the chassis from a retracted position to an extended position, the locking pin positioned to be outside a travel path of the locking tab when the locking pin is in the retracted position, the locking pin positioned to intersect the travel path of the locking tab when the locking pin is in the extended position.

2. The work vehicle of claim 1, further comprising a lever accessible from an operator's station of the work vehicle, the lever configured to actuate the locking pin between the retracted position and the extended position.

3. The work vehicle of claim 1, further comprising a hollow cylinder disposed on the chassis, wherein the hollow cylinder extends through a portion of the chassis and the locking pin is disposed within the hollow cylinder.

4. The work vehicle of claim 3, wherein the locking pin is included in a lock assembly, the lock assembly further comprises a lever, the lever is accessible from within an operator's station of the work vehicle, and the lock assembly is configured such that rotation of the lever in a first direction moves the locking pin toward the extended position and rotation of the lever is a second direction opposite the first direction moves the locking pin towards the retracted position.

5. The work vehicle of claim 1, wherein the locking tab is integrally formed with the boom.

6. The work vehicle of claim 1, wherein the locking tab protrudes downwardly and rearwardly from a pivotal connection between the boom and the lower link when the linkage is in a boom locking position, and the locking tab is in contact with the locking pin when the locking pin is in the extended position and the linkage is in the boom locking position.

7. A work vehicle comprising:
a chassis;
a linkage comprising:
an upper link pivotally connected to an upper rear portion of the chassis at a first end and pivotally connected to a boom at a second end opposite the first end;
a lower link pivotally connected to an upper front portion of the chassis at a first end and pivotally connected to the boom at a second end opposite the first end; and
the boom, the boom comprising a forked shape with a front arm at its forward end which forks into an upper arm and a lower arm at its rearward ends, the front arm positioned forward of the upper arm and the lower arm and pivotally connected to a work tool assembly at one end, the upper arm positioned above the lower arm and rearward of the front arm when the linkage is at a position where the work tool assembly is resting on the ground, the upper arm fixedly connected to the front arm at a first end and pivotally connected to the upper link at a second end opposite the first end, the lower arm fixedly connected to the front arm at a first end and pivotally connected to the lower link at a second end opposite the first end;
a locking tab, the locking tab extending from a pivotal connection between the boom and the lower link in a direction away from the front arm, the locking tab connected to at least one of the lower arm and the lower link; and
a locking pin connected to the chassis, the locking pin laterally extendable relative to the chassis from a retracted position to an extended position, the locking pin positioned to be outside a travel path of the locking tab when the locking pin is in the retracted position, the locking pin positioned to intersect the travel path of the locking tab when the locking pin is in the extended position.

8. The work vehicle of claim 7, wherein the locking tab is fixedly connected to the lower arm.

9. The work vehicle of claim 8, wherein the locking tab is integrally formed with the lower arm.

10. The work vehicle of claim 7, wherein the locking tab is fixedly connected to the lower link.

11. The work vehicle of claim 10, wherein the locking tab is integrally formed with the lower link.

12. The work vehicle of claim 7, further comprising a lever connected to the locking pin, wherein the lever is accessible from within an operator's station of the work vehicle and the lever is configured such that actuation of the lever moves the locking pin between the retracted position and the extended position.

13. The work vehicle of claim 7, wherein the locking tab protrudes downwardly and rearwardly from the pivotal connection between the boom and the lower link when the linkage is in a boom locking position, and the locking tab is in contact with the locking pin when the locking pin is in the extended position and the linkage is in the boom locking position.

14. The work vehicle of claim 7, further comprising a hollow cylinder disposed on the chassis, wherein the hollow cylinder extends through a portion of the chassis and the locking pin is disposed within the hollow cylinder.

15. The work vehicle of claim 14, wherein the locking pin is included in a lock assembly, the lock assembly further comprises a lever, the lever is accessible from within an operator's station of the work vehicle, and the lock assembly is configured such that rotation of the lever in a first direction moves the locking pin toward the extended position and rotation of the lever is a second direction opposite the first direction moves the locking pin towards the retracted position.

* * * * *